United States Patent [19]

Chung et al.

[11] Patent Number: 5,049,249

[45] Date of Patent: * Sep. 17, 1991

[54] LOW CURE CATHODIC ELECTRODEPOSITION COATINGS

[75] Inventors: Ding Y. Chung, Rochester Hills; Tapan K. DebRoy, Utica, both of Mich.

[73] Assignee: E. I. Du Pont de Nemours and Company, Wilmington, Del.

[*] Notice: The portion of the term of this patent subsequent to Feb. 13, 2007 has been disclaimed.

[21] Appl. No.: 401,669

[22] Filed: Aug. 30, 1989

Related U.S. Application Data

[63] Continuation of Ser. No. 275,357, Nov. 23, 1988, Pat. No. 4,900,415.

[51] Int. Cl.$^5$ .................. C25D 13/06; C08L 63/00
[52] U.S. Cl. .................. 204/181.7; 523/415; 524/901; 525/526; 528/45
[58] Field of Search .................. 204/181.7; 523/414–417, 424, 404; 524/901; 525/526, 532; 528/45

[56] References Cited

U.S. PATENT DOCUMENTS

| | | | |
|---|---|---|---|
| 3,583,943 | 6/1971 | Weber et al. | 260/75 |
| 3,894,922 | 7/1975 | Bosso et al. | 204/181.7 |
| 3,935,087 | 1/1976 | Jerabek et al. | 204/181.7 |
| 4,399,074 | 8/1983 | Schaefer | 260/453 P |
| 4,419,294 | 12/1983 | Feldman et al. | 260/433 A |
| 4,496,706 | 1/1985 | Chang | 528/57 |
| 4,540,633 | 9/1985 | Kucera et al. | 428/423.1 |
| 4,543,405 | 9/1985 | Ambrose | 528/78 |
| 4,596,744 | 6/1986 | Anderson | 204/181.7 |
| 4,615,779 | 10/1986 | McCollum et al. | 204/181.7 |
| 4,656,211 | 4/1987 | Nasu | 528/45 |
| 4,725,661 | 2/1988 | Miyabayashi | 528/45 |
| 4,748,200 | 5/1988 | Nasu | 524/591 |
| 4,761,465 | 8/1988 | Speranza | 528/45 |
| 4,794,154 | 12/1988 | Benefiel | 528/45 |
| 4,806,585 | 2/1989 | Nukayama | 525/122 |
| 4,900,415 | 2/1990 | Chung et al. | 204/181.7 |

*Primary Examiner*—T. Tung
*Assistant Examiner*—David G. Ryser
*Attorney, Agent, or Firm*—Hilmar L. Fricke

[57] ABSTRACT

A low temperature cure electrodepositable cathodic resin is disclosed. The resin is the reaction product of a polyepoxide amine adduct and a novel blocked crosslinking agent. The crosslinking agent of our invention is tetramethylxylene diisocyanate blocked with any suitable blocking agent. The resulting resin can be cured at relatively low temperatures (250°–275° F.), which potentially allows the use of the resin with articles containing plastics.

8 Claims, No Drawings

LOW CURE CATHODIC ELECTRODEPOSITION COATINGS

CROSS REFERENCE TO RELATED APPLICATIONS

This application is a continuation of application Ser. No. 07/275,357 filed on Nov. 23, 1988 now U.S. Pat. No. 4,900,415.

TECHNICAL FIELD

The field of art to which this invention pertains is electrodepositable epoxy resins containing crosslinking agents to be used in cathodic electrocoat processes.

BACKGROUND ART

The coating of electrically conductive substrates by electrodeposition is a well known and important industrial process. (For instance, electrodeposition is widely used in the automotive industry to apply primers to automotive substrates). In this process, a conductive article is immersed as one electrode in a coating composition made from an aqueous emulsion of film-forming polymer. An electric current is passed between the article and a counter-electrode in electrical contact with the aqueous emulsion, until a desired coating is produced on the article. The article to be coated is the cathode in the electrical circuit with the counter-electrode being the anode.

Resin compositions used in cathodic electrodeposition baths are also well known in the art. These resins are typically manufactured from polyepoxide resins which have been chain extended and adducted to include a nitrogen. The nitrogen is typically introduced through reaction with an amine compound. Typically these resins are blended with a crosslinking agent and then salted with an acid to form a water emulsion which is usually referred to as a principal emulsion.

The principal emulsion is combined with a pigment paste, coalescent solvents, water, and other additives at the coating site to form the electrodeposition bath. The electrodeposition bath is placed in an insulated tank containing the anode. The article to be coated is made the cathode and is passed through the tank containing the electrodeposition bath. The thickness of the coating is a function of the bath characteristics, the electrical operating characteristics, the immersion time, and so forth.

The coated object is removed from the bath after a set amount of time. The object is rinsed with deionized water and the coating is cured typically in an oven at sufficient temperature to produce crosslinking.

The prior art of cathodic electrodepositable resin compositions, coating baths, and cathodic electrodeposition processes are disclosed in U.S. Pat. Nos. 3,922,253; 4,419,467; 4,137,140; and 4,468,307.

All current commercial cathodic electrocoat processes must be cured at a high temperature (e.g., 325° F. to 360° F.). However, at these high bake temperatures it is not possible to coat many plastic substrates because they tend to distort at high temperature. Nevertheless, there is a push within the automotive industry to go toward plastic substrates for certain uses. Thus there is a need for an electrocoat process that will allow curing at lower temperatures (e.g., 250° F.-275° F.) so that the baking process will not distort the plastic substrate.

The push toward low cure electrocoat systems has thus for been frustrated by bath instability, film roughness, poor coating corrosion resistance and poor chip resistance. These characteristics are interrelated and are thought to be at least partially caused by premature curing of the film while still in the electrocoat bath.

It is very important that the electrodeposited layer be of high quality even though it typically will be covered with top coats. Defects in the electrodeposited layer such as cratering or roughness may be evident through the top coats.

In order that plastic substrates may be used in electrocoat processes there is a need for an electrocoat system that will allow for low cure but also have a stable bath, smooth film, good corrosion resistance and acceptable chipping characteristics.

SUMMARY OF THE INVENTION

It has been discovered that by using a novel crosslinking agent, principal emulsions can be prepared that result in electrodeposition baths that are stable, will cure at lower temperatures and form films that are smooth and coatings with good corrosion and chip resistance. More specifically, a cathodic electrodepositable resin composition of the type comprising an epoxy amine adduct, blended with a blocked tetramethylxylene diisocyanate (TMXDI) crosslinker, and then salted to form a principal emulsion is disclosed. The improvement therein being the use of blocked tetramethylxylene diisocyanate as the crosslinking agent and the use of a secondary amine with a primary hydroxyl group to form the epoxy amine adduct.

The resulting coating composition cures at 250°-275° F. and has a pH of about 6.0 with low conductivity. The coating has a smooth appearance with good corrosion resistance, high rupture voltage and good throwpower.

DETAILED DESCRIPTION OF THE INVENTION

As previously mentioned, it is well known that most principal emulsions in electrodeposition baths comprise an epoxy amine adduct blended with a cross-linking agent and salted with an acid in order to get a water soluble product. Typical crosslinkers used in the prior art are aliphatic and aromatic isocyanates such as hexamethylene diisocyanate, toluene diisocyanate, methylene diphenyl diisocyanate and so forth. These isocyanates are pre-reacted with a blocking agent such as methyl ethyl ketoxime which blocks the isocyanate functionality (i.e. the crosslinking functionality). Upon heating the blocking agents separate and crosslinking occurs.

The key to choosing a cross-linking agent which is suitable for use at low cure conditions is finding one with the right reactivity and the correct unblocking temperature.

The cross-linking agent of our novel process is tetramethylxylene diisocyanate. TMXDI is first reacted with a polyol such as trimethylol propane (TMP) or other polyol containing two or more hydroxy functional groups. In our preferred mode the polyol is trimethylolpropane. The ratio of TMXDI to TMP is about 3:1. The resulting polyisocyanate is then reacted with a blocking agent under reaction conditions well known in the art until no free isocyanates are present. U.S. Pat. Nos. 4,031,050 and 3,947,358 show these reaction conditions. The blocking agents useful in this invention include acetone oxime, methyl amyl ketoxime, and particularly preferred is methyl ethyl ketoxime.

The blocking agent is usually added in an equivalent ratio of about 1:1 to the polyisocyanate. In addition, the reactor should also be charged with an organic solvent such as methyl ethyl ketone, methyl isobutyl ketone, and so forth.

In our preferred mode, the methyl ethyl ketoxime and TMXDI-TMP adduct are reacted at 50° C. to 100° C. for about one hour.

The polyepoxide resins which are used in the practice of the invention are polymers having a 1,2-epoxy equivalency greater than one and preferably about two, that is, polyepoxides which have on an average basis two epoxy groups per molecule. The preferred polyepoxides are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,2-bis-(4-hydroxy-3-tertiarybutylphenyl)-propane, 1,1-bis-(4-hydroxyphenyl)ethane, 2-methyl-1,1-bis-(4-hydroxyphenyl) propane, 2,2-bis-(4-hydroxy-3-tertiarybutylphenyl)propane, bis-(2-hydroxynaphthyl) methane, 1,5-dihydroxy-3-naphthalene or the like.

Besides polyhydric phenols, other cyclic polyols can be used in preparing the polyglycidyl ethers of cyclic polyol derivatives. Examples of other cyclic polyols would be alicyclic polyols, particularly cycloaliphatic polyols, such as 1,2-cyclohexanediol, 1,4-cyclohexanediol, 1,2-bis(hydroxymethyl)cyclohexane, 1,3-bis-(hydroxymethyl)cyclohexane and hydrogenated bisphenol A.

The polyepoxides have molecular weights of at least 200 and preferably within the range of 200 to 2000, and more preferably about 340 to 2000.

The polyepoxides are preferably chain extended with a polyether or a polyester polyol which increases rupture voltage of the composition and enhances flow and coalescence. Examples of polyether polyols and conditions for chain extension are disclosed in U.S. Pat. No. 4,468,307. Examples of polyester polyols for chain extension are disclosed in U.S. Pat. No. 4,148,772.

The polyepoxide is reacted with a cationic group former, for example, an amine and then salted with an acid.

The amines used to adduct the epoxy resin are monoamines, particularly secondary amines with primary hydroxyl groups. When you react the secondary amine containing the primary hydroxyl group with the terminal epoxide groups in the polyepoxide the result is the amine/epoxy adduct in which the amine has become tertiary and contains a primary hydroxyl group. Typical amines that can be used in the invention are methyl ethanol amine, diethanolamine, and so forth. Our preferred amine is diethanol amine.

Mixtures of the various amines described above can be used. The reaction of the secondary amine with the polyepoxide resin takes place upon mixing the amine with the polyepoxide. The reaction can be conducted neat, or, optionally in the presence of suitable solvent. The reaction may be exothermic and cooling may be desired. However, heating to a moderate temperature, that is, within the range of 50 to 150° C., may be used to hasten the reaction.

The reaction product of secondary amine with the polyepoxide resin attains its cationic character by at least partial neutralization with acid. Examples of suitable acids include organic and inorganic acids such as formic acid, acetic acid, lactic acid, and phosphoric acid. The extent of neutralization will depend upon the particular product involved. It is only necessary that sufficient acid be used to disperse the product in water. Typically, the amount of acid used will be sufficient to provide at least 30 percent of the total theoretical neutralization. Excess acid beyond that required for 100 percent total theoretical neutralization can also be used.

The extent of cationic group formation of the resin should be selected such that when the resin is mixed with aqueous medium, a stable dispersion will form. A stable dispersion is one which does not settle or is one which is easily redispersible if some sedimentation occurs. In addition, the resin should be of sufficient cationic character that the dispersed resin particles will migrate towards the cathode when there is an electrical potential between an anode and a cathode immersed in the aqueous dispersion.

In general, most of the cationic resins prepared by the process of the invention contain from about 40 to 80, preferably from about 50 to 70 milliequivalents of cationic group per hundred grams of resin solids.

The cationic resinous binder should preferably have average molecular weights, as determined by gel permeation chromatography using a polystyrene standard, of less than 10,000, more preferably less than 5,000 and most preferably less than 3,000 in order to achieve high flowability.

The cationic resin and the blocked isocyanate are the principal resinous ingredients in the electrocoating composition and are usually present in amounts of about 30 to 50 percent by weight of solids.

Besides the resinous ingredients described above, the electrocoating compositions usually contain a pigment which is incorporated into the composition in the form of a paste. The pigment paste is prepared by grinding or dispersing a pigment into a grinding vehicle and optional ingredients such as wetting agents, surfactants, and defoamers. Pigment grinding vehicles are well known in the art. After grinding, the particle size of the pigment should be as small as practical, generally, a Hegman grinding gauge of about 6 to 8 is usually employed.

Pigments which can be employed in the practice of the invention include titanium dioxide, basic lead silicate, strontium chromate, carbon black, iron oxide, clay and so forth. Pigments with high surface areas and oil absorbencies should be used judiciously because they can have an undesirable effect on coalescence and flow.

The pigment-to-resin weight ratio is also fairly important and should be preferably less than 0.5:1, more preferably less than 0.4:1, and usually about 0.2 to 0.4:1. Higher pigment-to-resin solids weight ratios have also been found to adversely affect coalescence and flow.

The coating compositions of the invention can contain optional ingredients such as wetting agents, surfactants, defoamers and so forth. Examples of surfactants and wetting agents include alkyl imidazolines such as those available from Ciba-Geigy Industrial Chemicals as "Amine C", acetylenic alcohols available from Air Products and Chemicals as "Surfynol 104". These optional ingredients, when present, constitute from about 0 to 20 percent by weight of resin solids. Plasticizers are optional ingredients because they promote flow. Examples are high boiling water immiscible materials such as ethylene or propylene oxide adducts of nonyl phenols or bisphenol A. Plasticizers are usually used at levels of about 0 to 15 percent by weight resin solids.

Curing catalysts such as tin catalysts are usually present in the composition. Examples are dibutyltin dilaurate and dibutyltin oxide. When used, they are typically present in amounts of about 0.05 to 1 percent by weight tin based on weight of total resin solids.

The electrodepositable coating compositions of the present invention are dispersed in aqueous medium. The term "dispersion" as used within the context of the present invention is believed to be a two-phase translucent or opaque aqueous resinous system in which the resin is in the dispersed phase and water the continuous phase. The average particle size diameter of the resinous phase is about 0.1 to 10 microns, preferably less than 5 microns. The concentration of the resinous products in the aqueous medium is, in general, not critical, but ordinarily the major portion of the aqueous dispersion is water. The aqueous dispersion usually contains from about 3 to 50 percent preferably 5 to 40 percent by weight resin solids. Aqueous resin concentrates which are to be further diluted with water, generally range from 10 to 30 percent by total weight solids.

Besides water, the aqueous medium may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene glycol. The amount of coalescing solvent is not unduly critical and is generally between about 0 to 15 percent by weight, preferably about 0.5 to 5 percent by weight based on total weight of the resin solids.

EXAMPLE A

Backbone Resin

The following components were charged into a suitable reactor vessel: 1217 parts "Epon 828" (a diglycidyl ether of bisphenol A from Shell Chemical Co.) having an epoxy equivalent weight of 188; 444 parts of ethoxylated Bisphenol A having an hydroxy equivalent weight of 227 ("Synfac 8009" from Milliken Co.); 355 parts of Bisphenol A; and 106 parts of xylene. The charge was heated to 145° C. under a dry nitrogen blanket and 2.1 parts of benzyl dimethyl amine. The reaction mixture was further heated to 160° C. and held for 1 hour. An additional 4.2 parts of benzyl dimethyl amine were added, and the mixture held at 147° C. until the desired weight per epoxide (WPE) was achieved. The mixture was cooled to 98° C., and 203 parts of diethanolamine were added. The mixture was held at 120° C. for 1 hour, and then 600 parts of methyl isobutyl ketone were added.

EXAMPLE B

Crosslinker

A methyl ethyl ketoxime polyisocyanate was prepared by slowly charging 182 parts of methyl ethyl ketoxime in a reaction vessel containing 955 parts of "Cythane 3160" (the adduct of meta tetramethyl xylene diisocyanate and trimethyolpropane, 78.8% non-volatiles and 359 isocyanate equivalent weight from American Cyanamide) and 198 parts of methyl isobutyl ketone at 65° C. under a nitrogen blanket. The mixture was maintained at 85° C. for one hour until essentially all the isocyanate was consumed as indicated by infrared scan.

| Example C | Wt. | NV |
|---|---|---|
| QUATERNIZING AGENT | | |
| 2-Ethylhexanol half capped TDI in MIBK | 320.0 | 304 |
| Dimethylethanolamine | 87.2 | 87.2 |
| Aqueous Lactic Acid Solution | 117.6 | 88.2 |
| 2-Butoxyethanol | 39.2 | |
| PIGMENT GRINDING VEHICLE | | |
| "Epon 829" | 720 | 682 |
| Bisphenol A | 289.6 | 289.6 |
| 2-Ethylhexanol half capped TDI in MIBK | 406.4 | 386.1 |
| Quaternizing Agent (from above) | 496.3 | 421.9 |
| Deionized Water | 71.2 | |
| 2-Butoxyethanol | 149.0 | |

The quaternizing agent was prepared by adding dimethylethanolamine to the ethylhexanol half-capped Toluene diisocyanate in a suitable reaction vessel at room temperature. The mixture exothermed and was stirred for one hour at 80° C. Lactic acid was then charged followed by the addition of 2-butoxyethanol. The reaction mixture was stirred for about one hour at 65° C. to form the desired quaternizing agent.

To form the pigment grinding vehicle "Epon 829" (a diglycidyl ether of bisphenol A from Shell Chemical Co.) and Bisphenol A were charged under a nitrogen atmosphere to a suitable reaction vessel and heated to 150°-160° C. to initiate an exothermic reaction. The reaction mixture was permitted to exotherm for one hour at 150°-160° C. The reaction mixture was then cooled to 120° C. and the 2-ethylhexanol half-capped toluene diisocyanate was added. The temperature of the reaction mixture was held at 110°-120° C. for one hour, followed by the addition of the 2-butoxyethanol. The reaction mixture was then cooled to 85°-90° C., homogenized and then charged with water, followed by the addition of the quaternizing agent (prepared above). The temperature of the reaction mixture was held at 80°-85° C. until an acid value of about 1 was obtained. The reaction mixture had a solids content of 55 percent.

| PIGMENT PASTE | |
|---|---|
| | Wt. |
| Grind Vehicle | 266.62 |
| Deionized Water | 385.00 |
| Carbon Black | 10.81 |
| Aluminum Silicate | 25.92 |
| Lead Silicate | 51.83 |
| Basic Lead Silica Chromate | 22.21 |
| Dibutyl Tin Oxide | 296.23 |
| Deionized Water | 59.08 |

The above ingredients were mixed together and ground in a mill to a Hegman No. 7 grind.

EXAMPLE 1

Pigment

A pigment dispersion was made by grinding 141.9 parts of the grind resin (from Example C), 240 parts deionized water, 217.8 parts of aluminum silicate, 37.3 parts of lead silicate, 6.2 parts of carbon black, 6.2 parts of basic lead silica chromate, 87.1 parts of titanium dioxide, 13.7 parts dibutyl tin oxide in a vertical sand-grinder until the maximum particle size of the mixture was about 12 microns. Then, 238.4 parts of water were added.

EXAMPLE 2

Principal emulsion

The following materials were charged into a suitable reaction vessel: 187.6 parts backbone resin Example A, 143.2 parts crosslinker Example B, 6.1 parts Glacial acetic acid, 1.8 parts surfactant solution [a mixture of "Surfynol 104" (from Air Products), "Amine C" (from Ciba-Geigy), and butyl cellosolve in equal portions, plus a small amount of acetic acid], 36.3 parts PPH (propylene glycol phenyl ether) and allowed to mix until a homogenous solution was achieved. 325.5 parts of deionized water were added under high shear to form the emulsion. The solvents contained in the backbone and crosslinker were allowed to evaporate from the emulsion at room temperature under slow agitation.

EXAMPLE 3

Low bake cathodic electrocoat system

A cationic electrodepositable paint was prepared by blending 651.0 parts of the principal emulsion Example 2, 168.7 parts pigment dispersion Example 1, and 680.0 parts deionized water. The bath paint had a total solids content of 19.5 wt. %, pH 7.1, and conductivity 1856 micro Siemens. A phosphated steel panel electrocoated at 200 Volts gave a smooth film of 23 microns thickness and excellent cure at 121° C. (250° F.) ten minutes metal temperature. This material has good corrosion resistance over phosphated cold roll steel and pre-treated metals (galvanized), as indicated by the results from a cyclic corrosion test.

We claim:

1. A method of coating an electrically conductive article with the film forming resin using cathodic electrodeposition comprising:
   (1) forming a polyepoxide amine adduct;
   (2) forming a blocked crosslinker by bringing into contact tetramethyl xylene diisocyanate and a polyol under conditions that will cause a reaction and then totally blocking the reaction product with an oxime;
   (3) mixing said polyepoxide amine adduct with the blocked crosslinker;
   (4) adding acid and water to the mixture of the epoxy amine adduct and the crosslinker thereby forming a principal emulsion;
   (5) mixing the principal emulsion with the appropriate amount of water and pigment paste to form an electrocoat bath;
   (6) immersing the article in the electrocoat bath; and
   (7) passing a direct current across the article.

2. A resin composition for use as the film forming component in a cathodic electrodeposition process, comprising the reaction product of (A) a polyepoxide amine addust and (B) a cross-linking agent, said cross-linking agent being formed by brining into contact tetramethyl xylene diisocyanate and a polyol under conditions that will cause a reaction and then totally blocking the reaction product with an oxime, wherein the resin composition can be cured at temperatures below 275° F.

3. The resin product of claim 2 wherein said polyol is trimethylolpropane and the ratio of trimethylolpropane to tetramethyl xylene diisocyanate is about 1:3.

4. The resin composition of claim 2 in which said polyepoxide amine addjuct is formed by mixing a polyepoxide with a secondary amine having primary hydroxyl groups at appropriate reaction conditions.

5. The resin composition of claim 4 in which said secondary amine having primary hydroxyl groups is selected from the group consisting of methyl ethanol amine or diethanol amine.

6. The resin composition of claim 4 in which said polyepoxide amine adduct is a polymer having an average of about two epoxy groups per molecule.

7. The resin composition of claim 6 in which said polyepoxides are polyglycidyl ethers of polyhydric phenols.

8. The resin composition of claim 2 in which said oxime blocking agent is selected from the group consisting of acetone oxime, methyl ethyl ketoxime, methyl amyl ketoxime, or methyl isobutyl ketoxime.

* * * * *